(12) United States Patent
Salesse et al.

(10) Patent No.: US 6,997,668 B2
(45) Date of Patent: Feb. 14, 2006

(54) LOAD HANDLING DEVICE WITH SERVO FEED-BACK CONTROL

(76) Inventors: Christian Salesse, 10, rue du Pilat, F-07100 Annonay (FR); Jean-Marc Loriot, 15, rue Lakanal, F-75015 Paris (FR)

( * ) Notice: Subject to any disclaimer, the term of this patent is extended or adjusted under 35 U.S.C. 154(b) by 34 days.

(21) Appl. No.: 10/221,290

(22) PCT Filed: Mar. 5, 2001

(86) PCT No.: PCT/FR01/00642

§ 371 (c)(1),
(2), (4) Date: Dec. 17, 2002

(87) PCT Pub. No.: WO01/66318

PCT Pub. Date: Sep. 13, 2001

(65) Prior Publication Data

US 2003/0152453 A1    Aug. 14, 2003

(30) Foreign Application Priority Data

Mar. 9, 2000 (FR) .................................. 00 03047

(51) Int. Cl.
*B66C 23/72* (2006.01)
(52) U.S. Cl. ................... 414/719; 414/917; 901/48
(58) Field of Classification Search ............... 414/719, 414/917, 21; 901/48; 254/274, 275, 360, 254/362

See application file for complete search history.

(56) References Cited

U.S. PATENT DOCUMENTS

| 4,640,663 A | * | 2/1987 | Niinomi et al. ........... 901/48 X |
| 4,907,571 A | * | 3/1990 | Futakami ................... 901/48 X |
| 5,667,186 A | * | 9/1997 | Luber et al. .............. 901/48 X |
| 5,915,673 A | * | 6/1999 | Kazerooni .............. 254/274 X |

FOREIGN PATENT DOCUMENTS

| DE | 41 21 334 A1  | 1/1993 |
| DE | 197 23 720 A1 | 12/1998 |
| EP | 0 327 094 A1  | 8/1989 |
| EP | 0 839 614 A1  | 5/1998 |
| EP | 0 967 172 A2  | 12/1999 |

* cited by examiner

*Primary Examiner*—Donald W. Underwood
(74) *Attorney, Agent, or Firm*—Christie, Parker and Hale, LLP

(57) ABSTRACT

The invention concerns a handling device comprising, in combination, a mechanical equilibrium mechanism (10) with low reaction time, having an arm (20) whereof the proximal end (22) is locked on a pivot pin (18) and whereof the distal end (26) is adapted to support a load (10), a force sensor (30) positioned in a selected site for detecting apparent weight variation the load (10) resulting from a force being exerted on said load in response to an operator's movement, servo feed-back means (32) actuated by the force sensor (30), and an actuator (34) controlled by the servo feed-back means (32) and connected to the arm to assist the operator's movement. The invention is applicable in particular to robot arms or the like.

6 Claims, 1 Drawing Sheet

LOAD HANDLING DEVICE WITH SERVO FEED-BACK CONTROL

CROSS-REFERENCE TO RELATED APPLICATION

Figure 1:
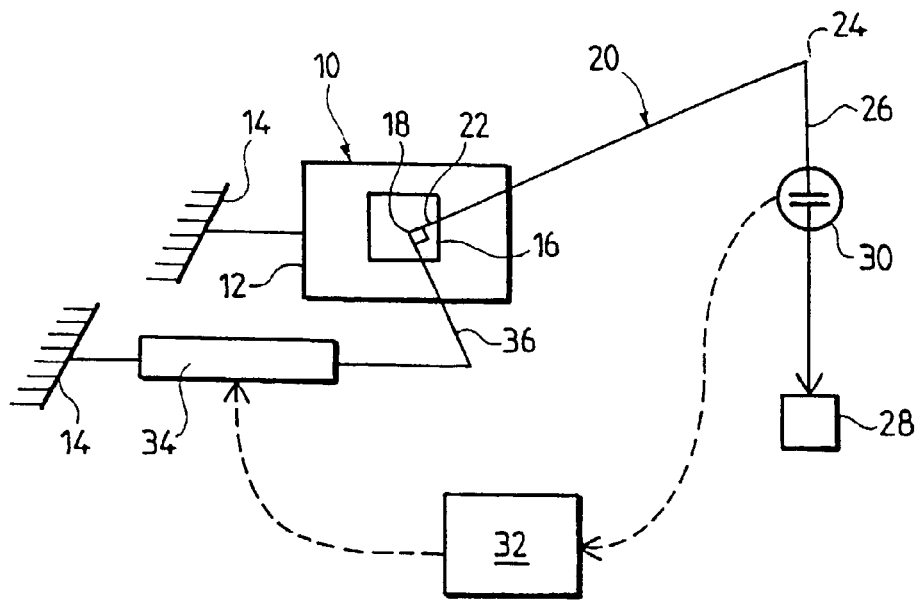

This application is a National Phase Patent Application of International Application Number PCT/FR01/00642, filed on Mar. 5, 2001, which claims priority of French Patent Application Number 00/03047, filed Mar. 9, 2000.

The invention relates to a load handling device.

Load handling devices are already known which generally comprise an arm pivotably mounted about a usually horizontal axis, in order to effect displacement of the load in a substantially vertical direction.

Such devices are used in particular for controlling a robot arm used for handling a load which may be a tool, for example.

Such devices must make it possible to give assistance to the operator, so that he can displace the load without special effort.

In other words, the handling device must be provided with a booster function to permit such handling without effort on the part of the operator.

Until now, such a booster function has been effected by three types of solution.

First of all, pneumatic solutions are known comprising a jack, which provides suspension of the load and/or vertical displacement thereof. Such solutions, whilst giving relatively satisfactory results for small loads, become impossible to manage as soon as the air volume of the jack goes above about 1 dm$^3$. This is due to the losses of load, which generate variations in pressure between the different points of the circuit, as well as to the compressibility of the air. Such pneumatic means have the disadvantage of having a response time in seconds, i.e. too great a time not to be felt by the operator.

Mixed solutions are also known, wherein a pneumatic system is coupled to a counterweight. These solutions, which give the same results as the above-mentioned solutions, have the further disadvantage of greatly increasing inertia, which can adversely affect the horizontal movements of the load even more.

Electrical solutions are also known, which generally imply the use of types of automatic load-controlling lifting blocks. These solutions have the disadvantages on the one hand of being sophisticated (risk of breakdown) and on the other hand of needing a weighing phase during which the load is not controlled and may pose a danger to the operator.

Thus in these three types of solution, the booster function for handling is barely ensured.

The object of the invention is in particular to overcome the above-mentioned disadvantages.

It aims in particular to procure a load handling device which is equipped with means which are simple to realise and which allow assistance to be given to handling.

It also aims to procure a handling device such as has the further advantage of having a rapid response time, so as not to be felt by the operator.

The invention proposes to this end a load handling device which comprises, in combination:

a mechanical equaliser with a rapid response time, comprising counterbalancing means housed in this body and acting on rotary shaft, as well as an arm whose proximal end is fixed to the rotary shaft and whose distal end is capable of carrying the load, and a booster mechanism comprising an effort sensor located at a selected site in order to detect a variation in apparent weight of the load consequent upon a force exerted on that load following a movement of an operator, servo means actuated by the effort sensor, and an actuator piloted by the servo means and connected to the arm in order to boost the movement of the operator.

Thus the invention resides in the combination on the one hand of a mechanical equaliser with a rapid response time, comprising essentially an arm connected to counterbalancing means and, on the other hand, a servo mechanism coupled to this arm in order to assist handling of a load carried by the arm.

By way of non-limiting example, an equalizer, also called counterbalancing device, of the type described in U.S. Pat. Nos. 4,620,829 and 4,901,591, the entire contents of which are incorporated herein by reference, can be used.

Such devices, which are purely mechanical, are used in particular for counterbalancing the forces acting on an arm stressed by a load, such as a tool. They therefore make it possible to obtain strict counterbalancing of the arm, whatever its angular position relative to the body on which it is articulated. Normally, the arm can pivot through 360° relative to the body, which allows the load to describe a circular trajectory.

In a counterbalancing device of this type, the operator can displace the load, e.g. a tool, virtually without effort, since the counterbalancing device compensates for the forces acting on the arm, whatever the angular position of the arm about its rotatable axis of articulation, which is generally horizontal.

In the invention, the rotary shaft of the arm of the equaliser is preferably substantially horizontal.

The effort sensor is provided to detect a variation of apparent weight of the load. It must be capable of detecting a difference in effort, however slight, generated by the operator on the load, in which case this difference may range from a few hundredths of a gramme to several kilogrammes.

The effort sensor is advantageously incorporated in a deformable mechanical structure capable of feeding back to the sensor the vertical component of the efforts resulting from the weight of the load. Preferably, this deformable mechanical structure is interposed between the distal end of the arm and the load, and comprises a parallelogram.

In the invention, the booster mechanism is provided to effect a vertical drive, in either direction, from the detection supplied by the effort sensor. This makes it possible to ensure, relative to the prior devices, considerable reduction in hysteresis as well as the effects of inertia for which the efforts of the operator have to compensate.

It should be emphasised that such results cannot be obtained except in the extend to which the booster mechanism supplies motor power which is applied to a small part of the load, whereas the majority of the effort linked to the weight are compensated by the equaliser proper, both with regard to the residual effort and the response time, without contributing inertia or substantial friction.

A mechanical equaliser, such as described in the above-mentioned patents makes it possible to obtain such high-precision counterbalancing.

The actuator of the assistance mechanism is advantageously connected to a support and to a rocker bar connected to the arm.

In a preferred embodiment of the invention, the actuator is a pneumatic jack, in particular with a volume of less than 1 dm$^3$. This small volume makes it possible to confer on the pneumatic jack operating parameters, particularly with respect to response time, which make it compatible with the features necessary for the handling comfort of the operator.

The pneumatic jack is advantageously controlled by servo means through a proportional valve.

Obviously, the servo means make it possible to pilot the actuator, e.g. a pneumatic jack, which boosts the desired movement by the operator. This boosting is therefore effected by simple pressure exerted by the operator directly on the load and not by action on a control knob.

Figure 2:
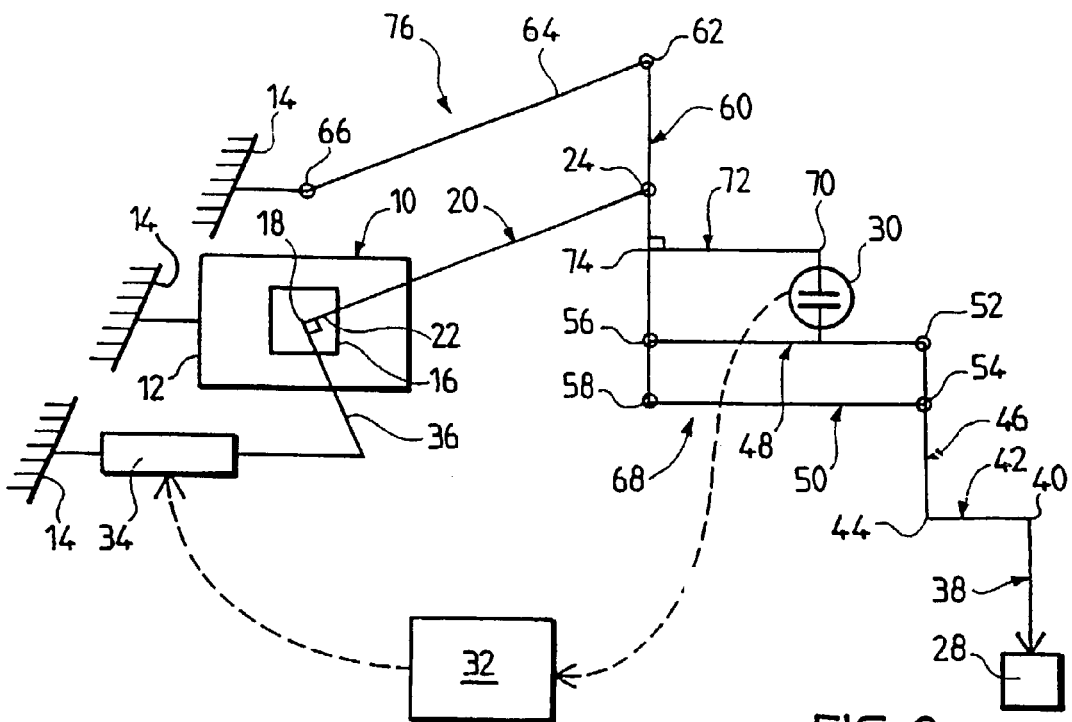

In the following description, given purely by way of example, the attached drawings will be referred to, which show:

FIG. 1, a diagram of a handling device, according to a first embodiment of the invention; and FIG. 2, a diagram of a handling device, according to a second embodiment of the invention.

FIG. 1 will be referred to first, which shows a handling device according to the invention. This device comprises a mechanical equaliser 10, with a rapid response time, comprising a body 12 fixed to a support 14 (itself fixed or mobile). The body houses on its interior counterbalancing means 16, which for example may be identical or similar to those described in the U.S. Pat. No. 4,620,829 or U.S. Pat. No. 4,901,591 cited above, which may be referred to for fuller information.

The counterbalancing means 16 act on a pivot pin 18 carried by the body 12 and extending, in the example, in a substantially horizontal direction. The equaliser 10 comprises an arm 20 having a proximal end 22 locking on the shaft 18 and a distal end 24, also referred to as the free end.

The arm 20 may rotate about the pivot 18 so that its free end 24 describes a circular trajectory, in which case the degree of movement of the arm may be between 0 and 360°.

The end 24 of the arm 20 forms an articulated link for a link element 26 at the end of which a load 28 may be attached. Due to the articulated link, the centre of gravity of the entire suspended mass (link element 26 and load 28) is positioned without effort and, obviously, perpendicular to the end 24 of the arm.

In the example, the horizontal shaft 18 forms the output shaft of the mechanical equaliser 10 and produces a sinusoidal torque.

As already indicated, such a mechanical equalizer is known per se and may be realized, for example, according to either of the above-mentioned patents.

In a counterbalancing device of this type, the counterbalancing means 16 are adjusted to provide counterbalancing depending on a specified load and thus to allow an operator to control this load without particular effort and in a short response time.

However, often the load carried by the arm varies in time.

An example can be found in an application where the load is a gripping device having its own weight and to which may be attached, during an operating cycle, one or more loads whose actual weight has just been added to that of the gripping device itself.

The result is a difference in load which means that the value of the load is no longer the same as that for which the equaliser has been set at the start.

Furthermore, such a counterbalancing device generally produces friction, however slight, which the operator has to overcome in handling the load.

With the invention, it is possible to take into account variations in load and friction inducted by the equaliser.

To this end, a servo mechanism is further provided which comprises first of all an effort sensor 30, e.g. of the electric type, located in a selected place to detect a variation in apparent weight of the load 28. This effort sensor must be appropriately incorporated in the link element 26, i.e. between the free end 24 of the arm and the load 28 itself.

This effort sensor continuously measures the weight of the load 28 and transmits this information to servo means 32 which are thus actuated by the effort sensor. These servo means 32 pilot an actuator 34, which is linked to the arm 20 in order to boost the movement of the operator. In the example, the actuator 34 is a pneumatic jack whose end is fixed to the support 14 and whose other end is connected to a rocker bar 36 connected to the arm 20. The pneumatic jack thus acts synchronously with the equaliser.

The sensor 30 makes it possible to detect differences in apparent weight of the load relative to a reference value (this small differences are due to the action of an operator trying to move the load 28 down or up) and adjust the pressure in the jack 34 so as to assist the operator in the movement that he wishes to make.

The handling device of FIG. 1 shows a simple assembly. However, it is possible to provide more sophisticated assemblies, as is shown in FIG. 2.

In this figure, as in FIG. 1, an equaliser 10 can be found having an arm 20, which is articulated about or fixed to a shaft 18 and a booster mechanism identical or similar to that described above and comprising an effort sensor 30, servo means 32 and an actuator 34 interposed between the support 14 and a rocker bar 36 connected to arm 20.

However, the arm 20 and the effort sensor 30 form part of a more sophisticated assembly.

The load 28 is supported vertically by a link element 38 carried at the end 40 of a horizontal arm 42, whose other end 44 is mounted at the lower end of a vertical shaft 46 capable of pivoting on itself, in such a manner that the arm 42 can describe a rotary movement relative to the shaft 46. This shaft 46 is fixed to a four-bar mechanism 68 which comprises two parallel rocker bars 48 and 50, substantially horizontal and articulated respectively by points 52 and 54 on the shaft 46 and by points 56 and 58 on a vertical shaft 60. This shaft 60 is articulated to the end 24 of the arm 20 of the equaliser and is articulated at 62 to the end of an arm 64 mounted parallel to the arm 20 and articulated by a point 66 to the support. Thus the shaft 60, in combination with the arm and the arm 64, forms a deformable parallelogram mechanism, in which the shaft 60 remains vertical.

The vertical shafts 46 and 60, as well as the rocker bars 48 and 50 (also known as horizontal shafts) form a deformable mechanical structure of the said parallelogram 68. The rocker bar 48 is held in a horizontal position via the effort sensor 30, which is fixed to the end 70 of a bar 72, in turn fixed rigidly at 74 to the vertical shaft 60.

The effort sensor 30 is deformed very easily according to the effort to which it is subjected and which it measures. The horizontal position of the rocker bar 48 is not strictly perfect, but sufficient not to distort the operation of the mechanism, taking into account the size of the measurement values necessary for it to function well.

It is essential that the deformable parallelogram 68 ensures that the shaft 46 is in a vertical position whilst feeding back to the sensor only the vertical component of the efforts generated by the weight of the load, whatever the position of the load relative to the vertical shaft 46, both in rotation about this shaft 46 and in radial translation relative to this shaft 46.

Furthermore, the shaft 60 ensures free rotation of the assembly about the points 56, 58, 24 and 62.

The shaft 60, as well as the arms 20 and 64, form a deformable parallelogram 76, which keeps this shaft 60 vertical.

Thus, as in the previous embodiment, the equaliser 10 effects compensation for the majority of the weight of the load as well as of the mechanical structure forming the two parallelograms 68 and 76.

The sensor 30 continuously measures the weight of the load and transmits the value to servo means 32, which themselves pilot the actuator 34, in the same manner as in the preceding embodiment.

Obviously, the invention is not limited to the embodiments described above by way of examples but extends to other modifications.

Obviously the equaliser itself is capable of being subjected to numerous modifications, and is not limited to a mechanical equaliser of the type of those described in the above-mentioned French patents.

Thus for example, the rotary shaft or output shaft of the equaliser is used as a base, either of a rotating arm, or of a parallelogram. However, other assemblies are conceivable, in particular an assembly where the equaliser is not incorporated into the structure of the device and where a transmission effects synchronisation of the movements and therefore of efforts.

In the same way, the booster mechanism is capable of being modified in many ways, and it is possible to provide other servo means than those described above.

Although the actuator is preferably a pneumatic jack, it is conceivable to use other types of actuator capable of forming a drive for the arm.

What is claimed is:

1. A device for handling a load, comprising:
    a mechanical equaliser including counterbalancing means acting on a rotary shaft and having return means capable of adjusting the counterbalancing depending on the load, as well as an arm whose proximal end is fixed to the rotary shaft and whose distal end is capable of supporting the load;
    an effort sensor located at a selected site in order to detect a variation in apparent weight of the load resulting from a force exerted on the load directly by a human operator;
    servo means actuated by the effort sensor; and
    an actuator piloted by the servo means and connected to the arm in order to assist a movement of the load by the human operator.

2. The device according to claim 1, wherein the rotary shaft of the arm of the equaliser is substantially horizontal.

3. The device according to claim 1, wherein the effort sensor is incorporated in a deformable mechanical structure capable of feeding back to the effort sensor the vertical component of forces resulting from the weight of the load.

4. The device according to claim 3, wherein the deformable mechanical structure is interposed between the distal end of the arm and the load and comprises a parallelogram.

5. The device according to claim 1, wherein the actuator is connected to a support and a rocker bar connected to the arm.

6. The device according to claim 1, wherein the actuator is a pneumatic jack having a volume of less than 1 dm$^3$.

* * * * *